(12) United States Patent
Muraki et al.

(10) Patent No.: US 9,410,614 B2
(45) Date of Patent: Aug. 9, 2016

(54) SHIFT OPERATION APPARATUS FOR AN AUTOMATIC TRANSMISSION

(71) Applicant: Kabushiki Kaisha Atsumitec, Hamamatsu-shi (JP)

(72) Inventors: Shuji Muraki, Hamamatsu (JP); Takayuki Suzuki, Hamamatsu (JP); Shinichi Hino, Hamamatsu (JP)

(73) Assignee: KABUSHIKI KAISHA ATSUMITEC, Hamamatsu-Shi (JP)

( * ) Notice: Subject to any disclaimer, the term of this patent is extended or adjusted under 35 U.S.C. 154(b) by 509 days.

(21) Appl. No.: 13/928,218

(22) Filed: Jun. 26, 2013

(65) Prior Publication Data
US 2014/0007726 A1 Jan. 9, 2014

Related U.S. Application Data

(63) Continuation of application No. PCT/JP2011/080111, filed on Dec. 26, 2011.

(30) Foreign Application Priority Data

Dec. 27, 2010 (JP) .................. 2010-289225

(51) Int. Cl.
*F16H 59/08* (2006.01)
*F16H 61/22* (2006.01)
(Continued)

(52) U.S. Cl.
CPC ................ *F16H 59/08* (2013.01); *F16H 61/22* (2013.01); *G05G 1/10* (2013.01); *F16H 63/48* (2013.01); *F16H 2059/081* (2013.01); *Y10T 74/2014* (2015.01)

(58) Field of Classification Search
CPC .................... Y10T 74/2014; F16H 2059/026; F16H 9/12; F16H 2061/185
See application file for complete search history.

(56) References Cited

U.S. PATENT DOCUMENTS

| 3,098,131 A | * | 7/1963 | Gallagher | ............... | G04C 23/16 200/38 FA |
| 5,094,126 A | * | 3/1992 | Stainton | ................. | B60K 37/06 701/62 |

(Continued)

FOREIGN PATENT DOCUMENTS

| JP | 64-22634 | 2/1989 |
| JP | 2-108618 | 8/1990 |

(Continued)

OTHER PUBLICATIONS

International Search Report for PCT/JP2011/080111, dated Feb. 7, 2012.

*Primary Examiner* — David M Fenstermacher
(74) *Attorney, Agent, or Firm* — Knobbe, Martens, Olson & Bear, LLP

(57) ABSTRACT

A shift operating apparatus for an automatic transmission which designed to prevent movement of a shift operating device from a parking preparatory condition from being moved to one of the plurality of other gear positions during shifting from one of the other gear positions to the park position. The shift operating apparatus can include a shift operating device moveable between a park position and plurality of other gear positions other than the park position, a parking position detector for detecting when the shift operating device is in the park position. The shift operating device can be adapted to be moved through a parking preparatory condition when shifting between the park position and plurality of other gear positions. A restraint device can be configured to restrain a motion toward the plurality of other gear positions when the shift operating device is in the parking preparatory condition when shifting from one of the plurality of other gear positions to the parking position.

19 Claims, 15 Drawing Sheets

(51) Int. Cl.
*G05G 1/10* (2006.01)
*F16H 63/48* (2006.01)

(56) References Cited

U.S. PATENT DOCUMENTS

| | | | | |
|---|---|---|---|---|
| 5,161,422 A | * | 11/1992 | Suman | B60K 20/04 180/315 |
| 5,590,564 A | * | 1/1997 | Kishimoto | B62K 23/04 74/108 |
| 2003/0032523 A1 | * | 2/2003 | Kato | F16H 61/16 477/115 |
| 2007/0137358 A1 | * | 6/2007 | Vigil | B60K 37/06 74/473.3 |
| 2012/0143409 A1 | * | 6/2012 | Curtis | B60W 50/082 701/22 |
| 2012/0285284 A1 | * | 11/2012 | Wang | F16H 59/10 74/473.3 |
| 2013/0061706 A1 | * | 3/2013 | Wang | F16H 59/10 74/473.15 |
| 2015/0159747 A1 | * | 6/2015 | Hoskins | F16H 59/0217 74/473.23 |

FOREIGN PATENT DOCUMENTS

| | | |
|---|---|---|
| JP | 2000-352462 | 12/2000 |
| JP | 2001-354045 | 12/2001 |

* cited by examiner

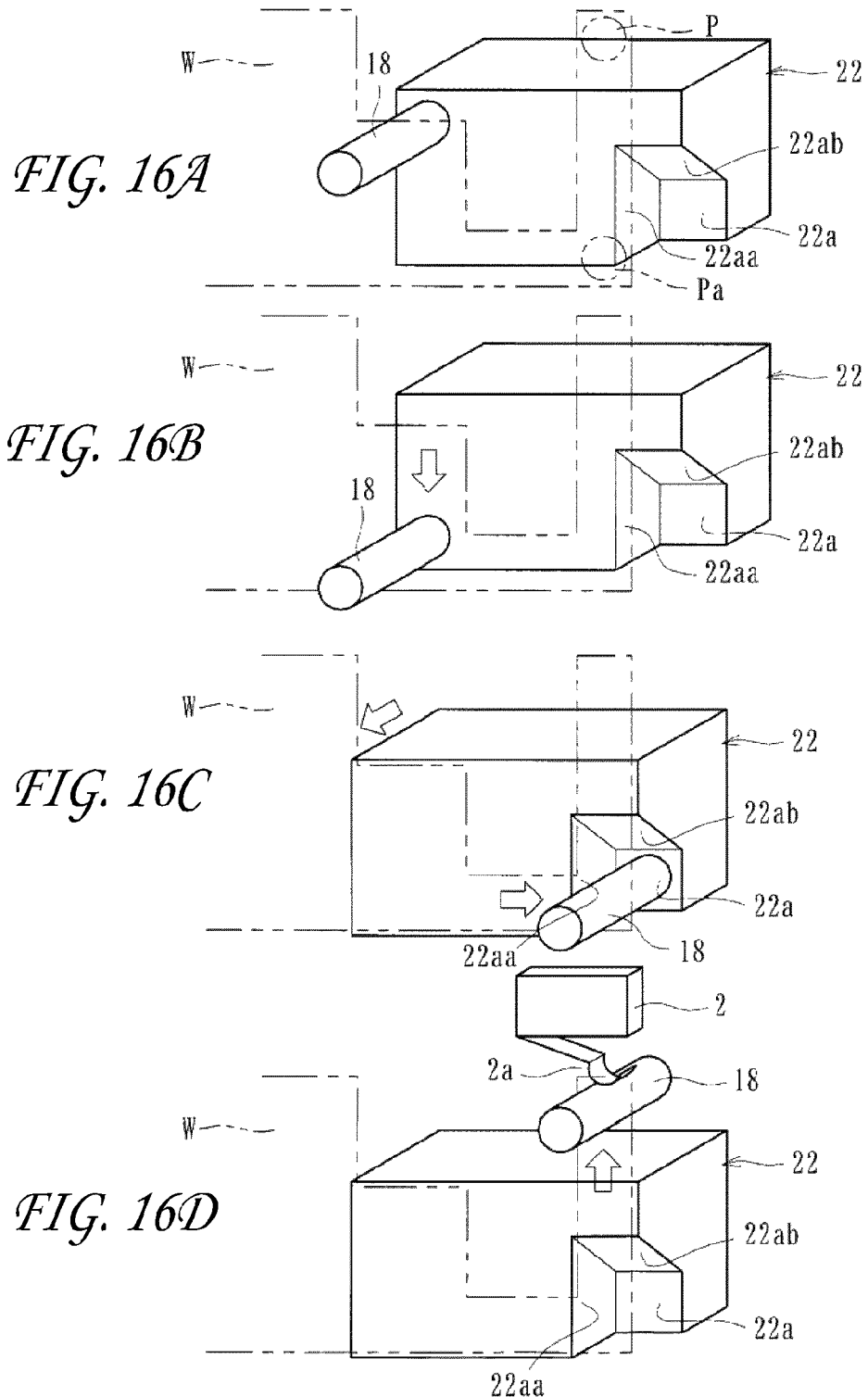

SHIFT OPERATION APPARATUS FOR AN AUTOMATIC TRANSMISSION

RELATED APPLICATIONS

The present application is a continuation of PCT Application No. PCT/JP2011/080111 filed Dec. 26, 2011, which claims priority to Japanese Application No. 2010-289225, filed Dec. 27, 2010 the entire contents of each of which are hereby incorporated by reference.

BACKGROUND OF THE INVENTIONS

1. Field of the Inventions

The present inventions relate shift operating apparatuses for transmissions, such as shift devices adapted to be moved through a parking preparatory condition during the course of shift between a parking position and other shift positions.

2. Description of the Related Art

Gear shifters for automatic transmission of vehicles, such as automobiles etc. usually allow a user to arbitrarily shift gears of an automatic transmission of a vehicle between park, neutral, and the forward and reverse gears. Such shifters typically comprise a shift operating device (e.g., a knob or a lever), arbitrarily movable between the parking position and other gear positions different from the parking position and a park position detecting device for detecting when the shift operating device is in the park position. In these systems, the shift operating device is adapted to be moved through a parking preparatory condition during the course of a shift between the park position and other gear positions.

The parking preparatory condition or position is a condition defined between the park position and the other positions (i.e. a condition other than the parking position, neutral, and the forward and reverse gear positions) for preventing the shift operating device from being abruptly or directly moved, for example, by an erroneous operation, from the parking position to another gear position, or reversely, from a gear position to the park position. In recent years, although the shift operating apparatuses for automatic transmissions provided with the parking position detecting means for detecting the shift operating means being in the parking position has been widely spread in view of safety, the parking position detecting means does not detect when a shift operating device is in the parking preparatory condition.

One example of automatic transmission the shift operating apparatus of the prior art summarized above is disclosed in Japanese Laid-open Patent Publication No. 2000-62491. The shift operating mechanism in this publication includes a dial-type operating knob (FIG. 1) which is adapted to be arbitrarily operated by a driver. The knob can be gripped, pressed axially inwardly, then rotated so as to be moved between any of the arbitrary shift positions (forward, neutral and reverse gears) and the park position by passing through the parking preparatory condition. More specifically, the parking preparatory condition of this type of shift operating device is a pushed-down or pushed-in operated position.

SUMMARY OF THE INVENTIONS

However, the shift operating apparatus for an automatic transmission of the prior art is structured so that the shift operating means (dial-type operation knob) in an gear position (e.g. the reverse "R" position) is able to be returned again to the same or other gear positions (e.g. the reverse "R" position or drive "D" position etc.) after pushing down the shift operating means while in the gear position (reverse "R" position) and moving to the parking preparatory condition without moving the shift operating means to the parking position. Thus, an aspect of at least one of the inventions disclosed herein includes the realization that a problem exists in mechanisms that allow such movements and such shift apparatuses can be improved by preventing such erroneous operation of the shift operating apparatus.

For example, when the shift operating apparatus is in the parking preparatory condition, a lock plate of the prior art does not engage a shifting shaft, the operation of the shift operating apparatus is not restrained. Accordingly, an erroneous operation such as the shift operating apparatus being returned to one of the forward or reverse gear positions, after having stopped an engine of a vehicle while the shift operating apparatus is in the parking preparatory condition.

Such an erroneous operation can be caused not only in the dial-type shift devices, but also in other types in which the shift operating apparatus is moved between the parking position and other gear positions through the parking preparatory condition (e.g. types provided with a gate type operating knob swingably operated in fore and aft as well as left and right directions along gate grooves or provided with a straight type operating knob swingably operated in fore and aft directions).

It is, therefore, an object of at least some of the inventions disclosed herein to provide a shift operating apparatus for an automatic transmission which is able to prevent a shift operating apparatus, when in a parking preparatory condition, from being moved to an arbitrary shift position during the course of shift from the arbitrary shift position to the parking position in order to further improve the safety of a vehicle.

Thus, in accordance with some embodiments, a shift operating apparatus for an automatic transmission of a vehicle can comprise a shift operating device able to arbitrarily operate an automatic transmission of a vehicle and to move between a parking position and an arbitrary shift position other than the parking position; a parking position detector configured to detect that the shift operating device is in the park position. The shift operating device being adapted to be moved through a parking preparatory condition during the course of shift between the parking position and another gear passion characterized in that the shift operating apparatus further comprises a restraint device configured to restrain a motion toward the other positions of the shift operating device being in the parking preparatory condition during the course of shift from a gear position to the parking position.

In some embodiments, the restraint device comprises a shift-lock mechanism configured to restrain or allow the motion from the parking position of the shift operating device.

In some embodiments, the shift operating device comprises a shaft member and an operating knob of a dial-type shift operating apparatus which is able to be arbitrarily operated by being gripped and rotated by a driver to operate the automatic transmission and to be moved between any of the gear positions and the parking position through the parking preparatory condition by axially being pushed down, and that the restraint device engages the shift operating apparatus being in the parking preparatory condition and restrains the motion of the shift operating device toward the other gear positions and allows the motion of the shift operating device toward the parking position.

In some embodiments, the shaft member of the shift operating device comprises a projected portion formed on the shaft member at a predetermined position thereof. The restraint device can comprise a stopper member biased toward a direction engageable with the projected portion, and wherein the stopper member of the restraint device engages the projected portion of the shift operating device being in the parking preparatory condition and restrains the motion of the shift operating device toward the other gear positions and allows the motion of the shift operating device toward the parking position.

In some embodiments, the shaft member of the shift operating device comprises a flange portion in addition to the projected portion, that the restraint device comprises a shift-lock mechanism in which the stopper member contacts the under surface of the flange portion when the shift operating device is in the parking position and restrains the motion toward a push-down direction of the shift operating device and in which the stopper member is separated from the flange portion to allow the push-down operation of the shift operating device.

In some embodiments, the shift operating device comprises an operating lever and an operating knob of a gate-type shift operating device which is able to be arbitrarily operated with being gripped and swung fore and aft as well as left and right directions by a driver to operate the automatic transmission and to be moved between the other gear positions and the parking position through the parking preparatory condition by being swung either one of left or right direction and then swung forward, and that the restraint device engages the shift operating device being in the parking preparatory condition and restrains the motion of the shift operating means toward the other gear positions and allows the motion of the shift operating device toward the parking position.

In some embodiments, the shift operating device comprises a push knob pushably operated by a driver and a lock pin moveable between a restraint position restraining the operation of the shift operating device and an allowable position allowing the operation of the shift operating device, the shift operating device further comprising an operating lever and an operating knob of a shift operating apparatus which is able to be moved between the other gear positions and the park position through the parking preparatory condition by a driver with the push knob being pushed down to move the lock pin to the allowable position, and that the restraint device abuts the lock pin so as to restrain the motion of the shift operating device being in the parking preparatory condition toward the arbitrary shift position and allow its motion toward the park position.

In the embodiments where the shift operating apparatus comprises a restraint device configured to restrain the motion toward the arbitrary shift position of the shift operating device being in the parking preparatory condition during the course of shift from the other gear positions to the parking position, it is possible to prevent a shift operating device being in a parking preparatory condition from being any of the gear positions during the course of shift from a gear position to the parking position and thus to further improve the safety of a vehicle.

In the embodiments where the restraint means comprises a shift-lock mechanism configured to restrain or allow the motion from the parking position of the shift operating device, it is possible to combine the shift-lock mechanism with the function of the restraint device and thus to reduce the number of structural parts as compared with a mechanism having a shift-lock mechanism separate from a restraint device.

In some embodiments having an operating knob of a dial-type shift operating apparatus, it is possible to prevent a shift operating device being in a parking preparatory condition from being moved to any other gear position during the course of shift from a gear position to the parking position and thus to further improve the safety of a vehicle.

In some embodiments where the shaft member of the shift operating device comprises a projected portion formed on the shaft member at a predetermined position thereof, the restraint device can comprise a stopper member ordinarily urged toward a direction engageable with the projected portion, and the stopper member of the restraint means engages the projected portion of the shift operating means being in the parking preparatory condition and restrains the motion of the shift operating means toward the arbitrary shift position and allows the motion of the shift operating means toward the parking position, it is possible in a simple structure to prevent a shift operating means being in a parking preparatory condition from being moved to an arbitrary shift position during the course of shift from the arbitrary shift position to the parking position and thus to improve the safety of a vehicle.

In some embodiments where the shaft member of the shift operating device comprises a flange portion in addition to the projected portion, and the restraint device comprises a shift-lock mechanism in which the stopper member contacts the under surface of the flange portion when the shift operating device is in the parking position and restrains the motion toward a push-down direction of the shift operating device and in which the stopper member is separated from the flange portion to allow the push-down operation of the shift operating device, it is possible to use such a configuration with a shift operating apparatus for an automatic transmission comprising a shift operating device including a dial-type operating knob. Also in such a shift operating apparatus for an automatic transmission, it is possible to combine the shift-lock mechanism with the function of the restraint device and thus to reduce the number of structural parts as compared with a mechanism having a shift-lock mechanism separate from a restraint means.

In some embodiments including an operating lever and an operating knob of a gate-type shift operating apparatus for an automatic transmission, it is possible to prevent a shift operating means being in a parking preparatory condition from being moved to an arbitrary shift position during the course of shift from the arbitrary shift position to the parking position and thus to further improve the safety of a vehicle.

In some embodiments including a shift operating apparatus for an automatic transmission comprising a shift operating knob comprising a push knob pushably operated by a driver and a lock pin moveable between a restraint position restraining the operation of the shift operating device and an allowable position allowing the operation of the shift operating device, it is possible to prevent a shift operating device from being in a parking preparatory condition from being moved to another gear position during the course of shift from a gear shift position to the park position and thus to further improve the safety of a vehicle.

BRIEF DESCRIPTION OF THE DRAWINGS

FIG. 16(*a*)-(*d*): Schematic views showing the course of operation of the lock pin and restraint means of the shift operating apparatus for an automatic transmission of FIG. 15.

DETAILED DESCRIPTION OF PREFERRED EMBODIMENTS

Figure 1:
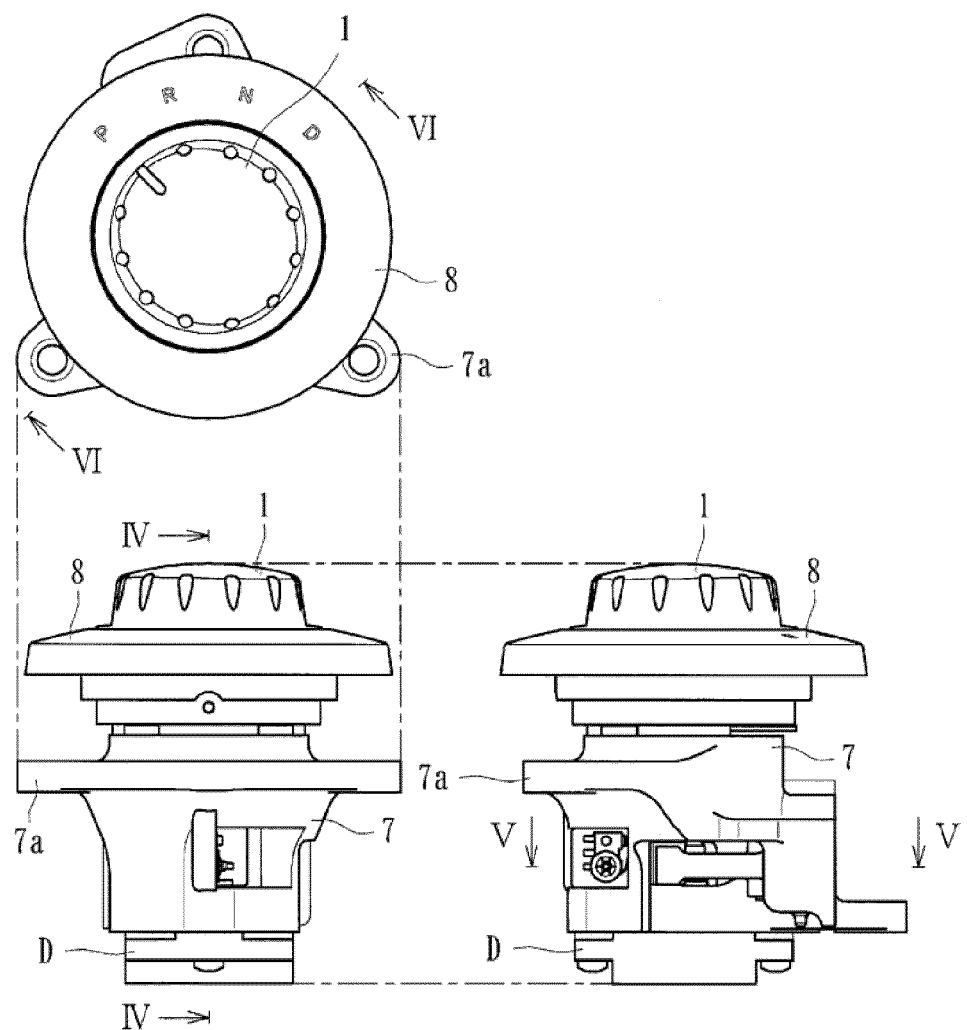
FIG. 1: A plan view, a front elevation view and a side elevation view showing a shift operating apparatus for an automatic transmission according to a first embodiment of the present invention.
Figure 2:
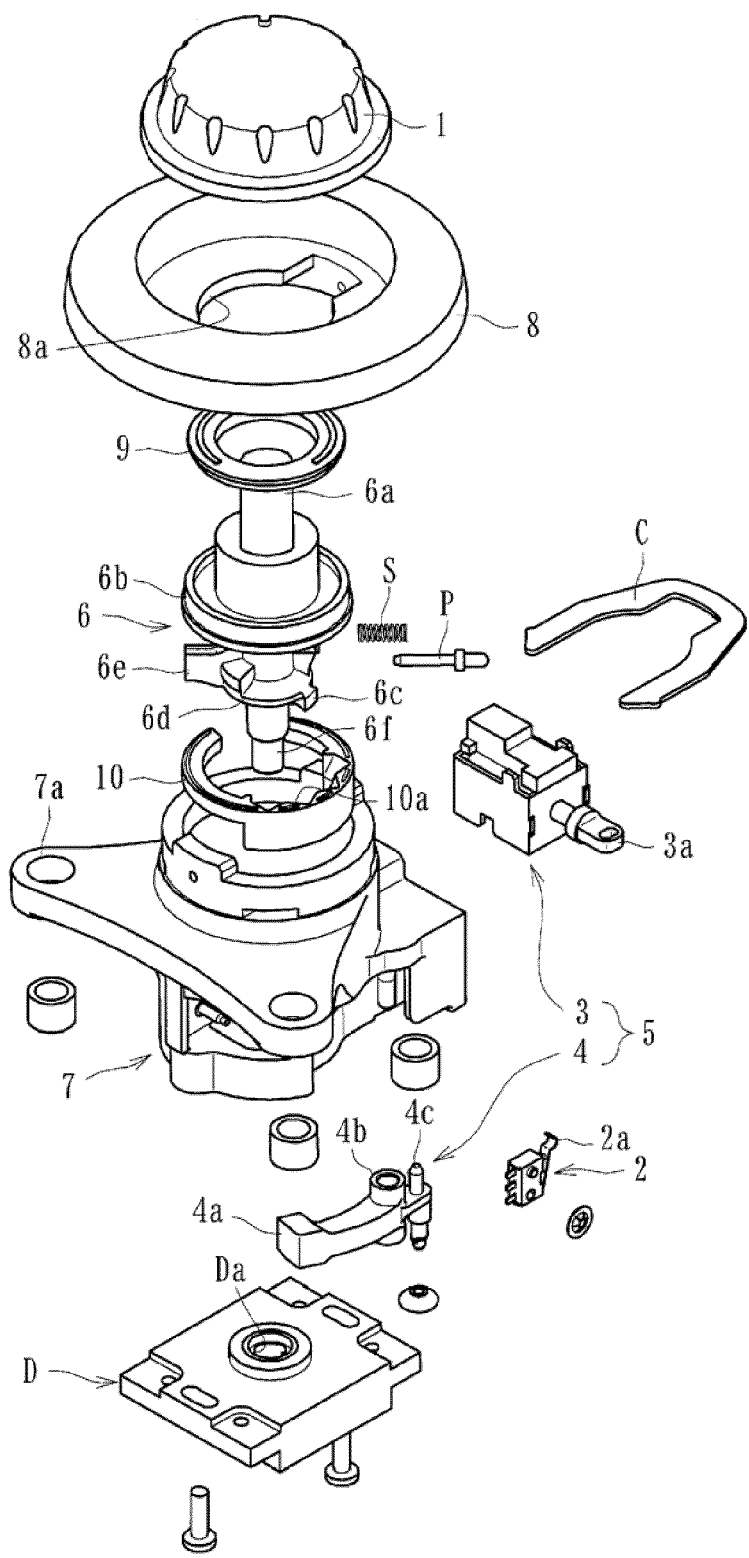
FIG. 2: An exploded perspective view of the shift operating apparatus for an automatic transmission of FIG. 1.

The shift operating apparatus for an automatic transmission of a first embodiment can be secured on an instrument panel or a steering column of a vehicle such as an automobile to operate an automatic transmission of a vehicle and can comprise a shift operating device 1 having a shaft member 6, a parking position detecting means 2, a shift-lock mechanism 5 (which can serve as a restraint device or restraint means in this embodiment) comprising a solenoid 3 and a stopper member 4, and a main body 7 as shown in FIGS. 1-7.

The main body 7 can form a casing for containing parts of the shift operating apparatus for an automatic transmission of this embodiment and has a bracket portion 7*a* through which bolts etc. are inserted to be screwed on a vehicle. A case 8 can be mounted on an upper portion of the main body 7 and a rotation sensor D is mounted on a lower portion of the main body 7. Various structural parts of the shift operating apparatus for an automatic transmission such as the shift-lock mechanism 5 and shaft member 6 are contained in the main body 7.

The shift operating device 1 (which can serve as a shift operating means) is able to arbitrarily operate the automatic transmission of a vehicle and movable between a parking position P and other gear positions other than the parking position P (e.g. a reverse position R for reversing a vehicle, a neutral position N for disconnecting the automatic transmission and wheels and a driving position D for driving a vehicle forward).

According to the present embodiment, there can be provided a parking preparatory condition between the parking position P and the other gear positions, referred to herein as "arbitrary shift positions". In the embodiments, the reverse position R is selected as one example of an initial arbitrary shift position and accordingly the parking preparatory condition is entered during the course of a shift between the parking position P and the arbitrary shift position (i.e. the reverse position R).

In order to prevent the shift operating device 1 from being inadvertently moved by an erroneous operation during the course of shift from the parking position P to the arbitrary shift position (e.g. R position) or from the arbitrary shift position (e.g. R position) to the parking position P, the "parking preparatory condition" is set during the course of shifting between the parking position P and the arbitrary shift position (e.g. R position). Accordingly, the safety of a shift operation can be further improved since the shift operation due to the shift operating device 1 is performed through the "parking preparatory condition".

As shown in FIG. 1, the shift operating device 1 according to this embodiment, comprises a dial-type operating knob 1 which is able to be operated by a driver by being gripped and rotated to arbitrarily operate the automatic transmission and to be moved between the arbitrary shift position (e.g. R position) and the parking position through the parking preparatory condition by axially being pushed down. As can be seen, the "parking preparatory condition" is a condition in which the shift operating device 1 is pushed down in an axial direction and rotated toward the parking position side (i.e. while being maintained in the pushed-down condition).

Figure 8A:
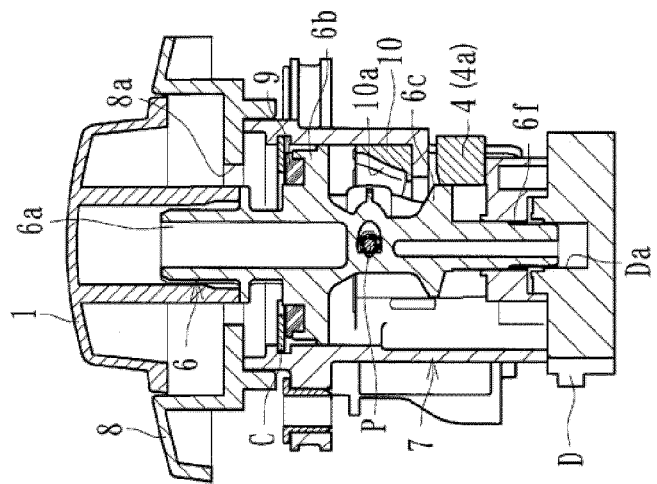
FIG. 8(*a*)-(*c*): A longitudinal-section view showing the course of operation of the shift operation means of the shift operating apparatus for an automatic transmission of FIG. 1.
Figure 8B:
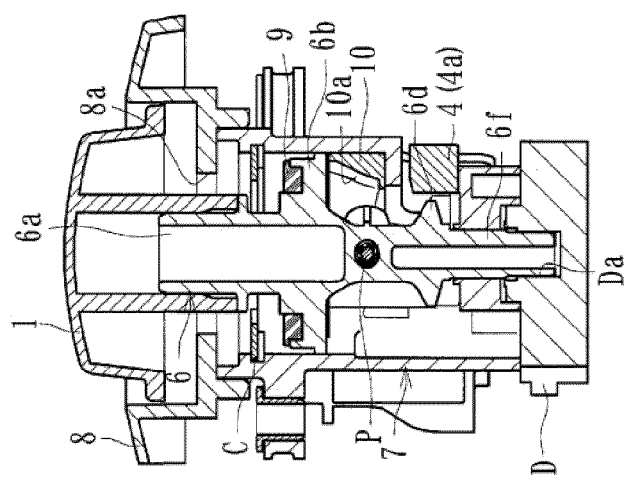
Figure 8C:
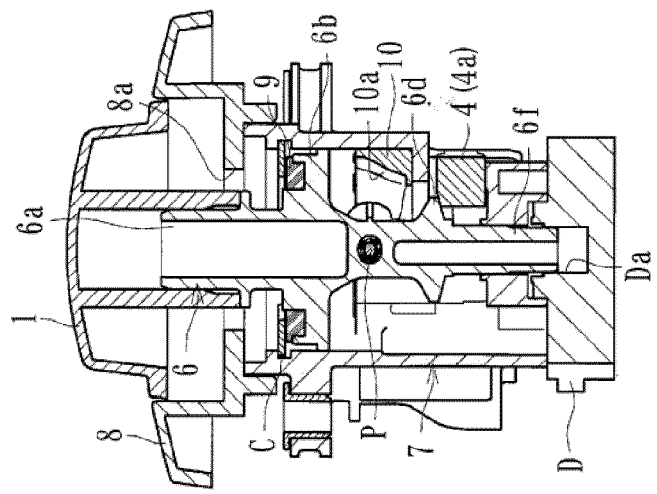

For example, the shift operating device 1 can be connected to a top end 6*a* of the shaft member 6 rotationally supported by the main body 7 and rotated by rotation of the shift operating device 1. The shaft member 6 is normally urged upward (e.g. biased toward the shift operating device 1) by a coil spring S so that the shift operating device 1 is pushed down against the urging force of the coil spring S. Accordingly, the shift operating device 1 can be positioned in the arbitrary shift position (R position) (see FIG. 8(*c*)) by axially pushing down while the shift operating device 1 is positioned in the parking position P (see FIG. 8(*a*)), toward the parking preparatory condition (see FIG. 8(*b*)) and then by rotating it toward the arbitrary shift position (R position) while maintaining the pushed-down condition and finally by releasing the pushing-down force due to the upward urging force of the coil spring S.

The case 8 can be secured on the upper side of the main body 7 and can include indicia on its top surface indicating shift positions of the shift operation device 1 (FIG. 1). The case 8 can be formed with a central through aperture 8*a* (FIG. 2) through which the shaft member 6 is passed. The rotation sensor D can be formed with a mounting aperture Da through which the bottom end 6*f* of the shaft member 6 is passed. The rotation sensor D can be configured to detect a rotation angle of shaft member 6. Detected signals are transmitted to a body of a vehicle (e.g. ECU) via a harness (not shown) and to control speeds of a vehicle in accordance with the shift position of the shift operating device 1.

Figure 7:
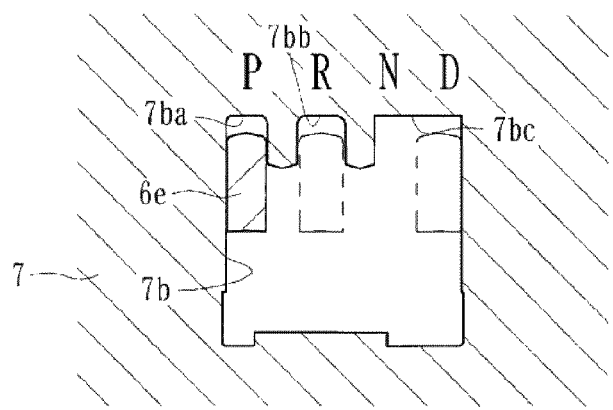
FIG. 7: A schematic view showing restraint groove of the shift operating apparatus for an automatic transmission of FIG. 1.

In addition, the shaft member 6 can be formed with a projected portion 6*e* projected laterally at a predetermined position on the shaft member 6 and an inner wall surface of the main body 7 can be formed with a restraint groove 7*b* at a position corresponding to the projected portion 6*e* as shown in FIG. 7. A plurality of recesses 7*ba*, 7*bb* and 7*bc* are formed side by side on the top side of the restraint groove 7*b*. The recesses 7*ba*, 7*bb* and 7*bc* are arranged so that the projected portion 6e is fitted in the recess 7ba when the shift operating device 1 is positioned in the parking position P as well as the projected portion 6e is fitted in the recess 7bb or 7bc when the shift operating device 1 is positioned respectively in the reverse position R or the drive position D.

Thus, the rotation is restrained due to fitting of the projected portion 6e in the recess 7ba or 7bb when a user attempts to rotate the shift operating device 1 from the parking position P to the arbitrary shift position (reverse position R) without being pressed down or attempts to rotate the shift operating device 1 from the arbitrary shift position (reverse position R) to the parking position P without being pressed down.

On the other hand, if the shift operating device 1 is pressed down to disengage the projected portion 6e of the shaft member 6 from the recess 7ba, the rotational operations of the shift operating device 1 from the parking position P to the arbitrary shift position (reverse position R) are not restrained. If the shift operating device 1 is pressed down to disengage the projected portion 6e of the shaft member 6 from the recess 7bb, the rotational operations of the shift operating device 1 from the arbitrary shift position (reverse position R) to the parking position P is not restrained.

In addition, the shaft member 6 is integrally formed with a diametrically enlarged portion 6b and a "C"-shaped clip C is fitted in a circumferential groove formed on an inner circumferential surface of the main body 7 corresponding to the upper portion of the diametrically enlarged portion 6b. The clip C prevents the shaft member 6 from being moved further upward and slipped off from the main body 7 (see FIGS. 8(a) and (c)). An annular cushion member 9 (see FIG. 6) is additionally arranged on the top of the diametrically enlarged portion 6b of the shaft member 6 to absorb shock of the portion 6b against the "C"-shaped clip C.

Figure 3:
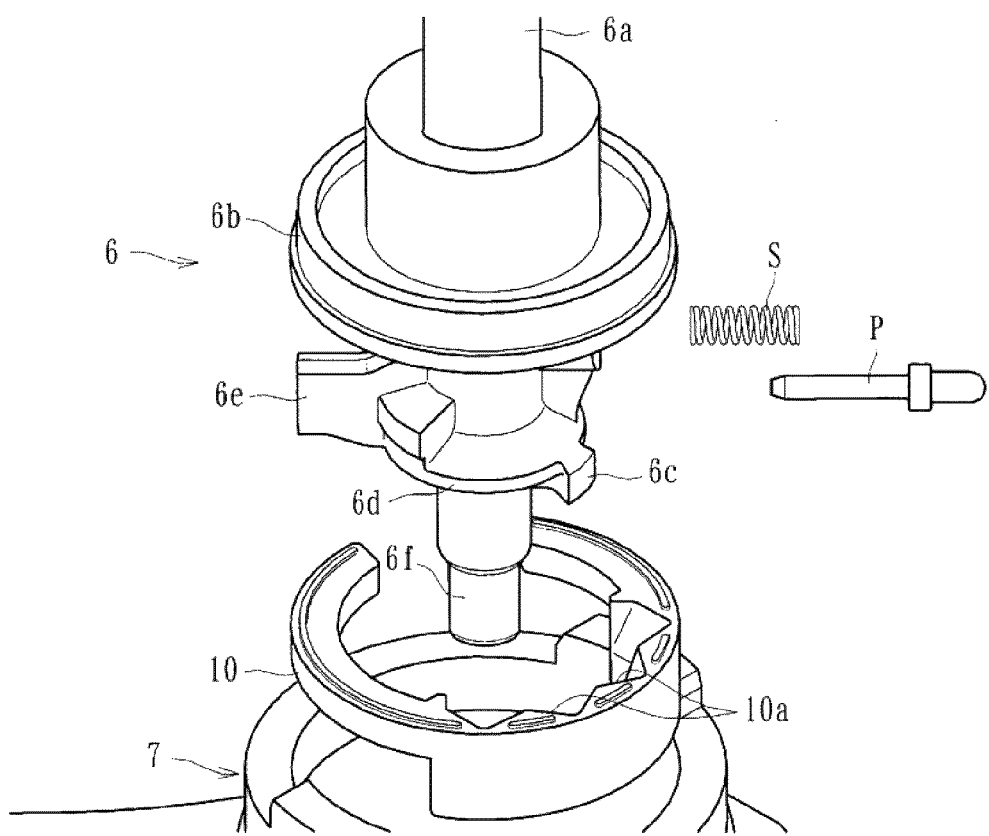
FIG. 3: An exploded perspective view showing a partially enlarged portion of the shift operating apparatus for an automatic transmission of FIG. 1.
Figure 4:
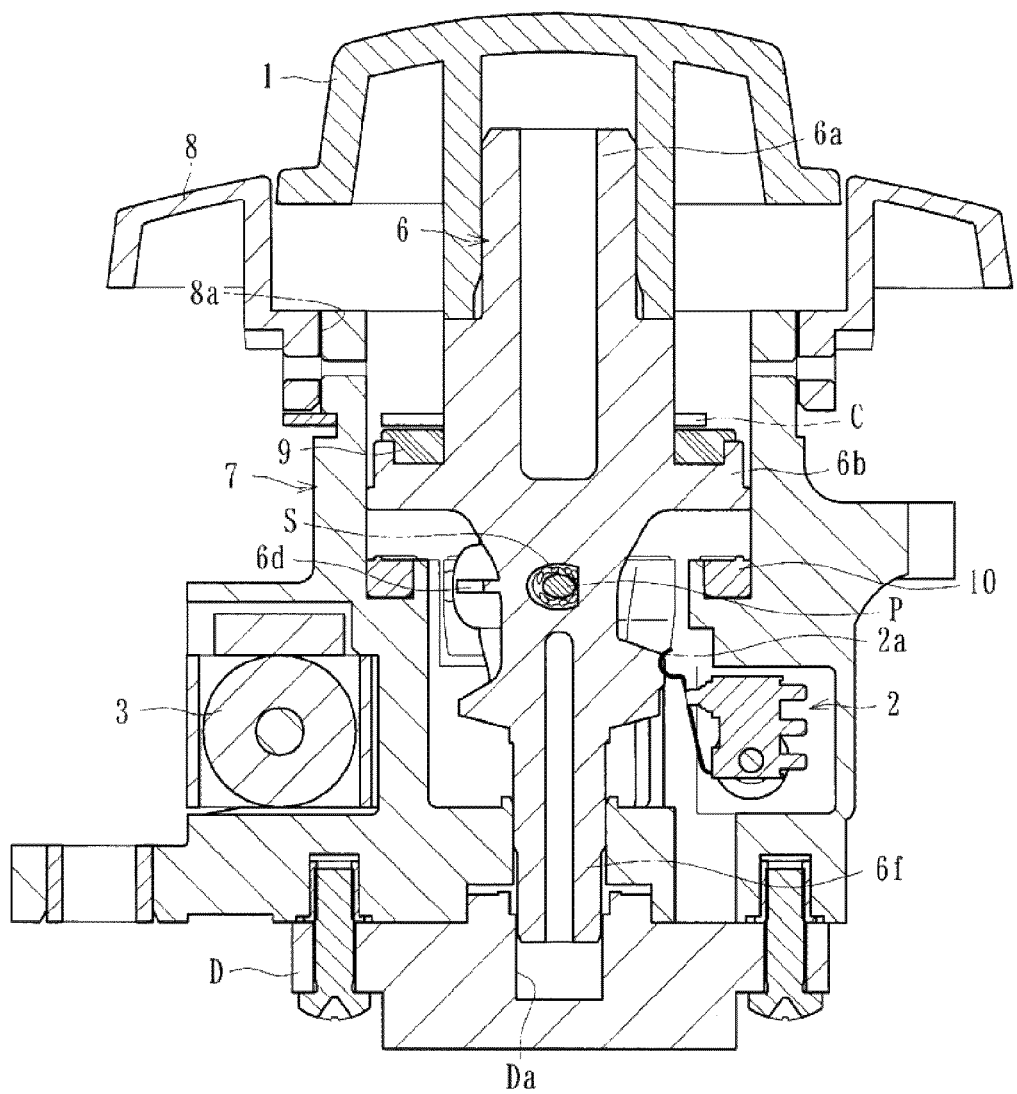
FIG. 4: A longitudinal-section view taken along a IV-IV line of FIG. 1.
Figure 6:
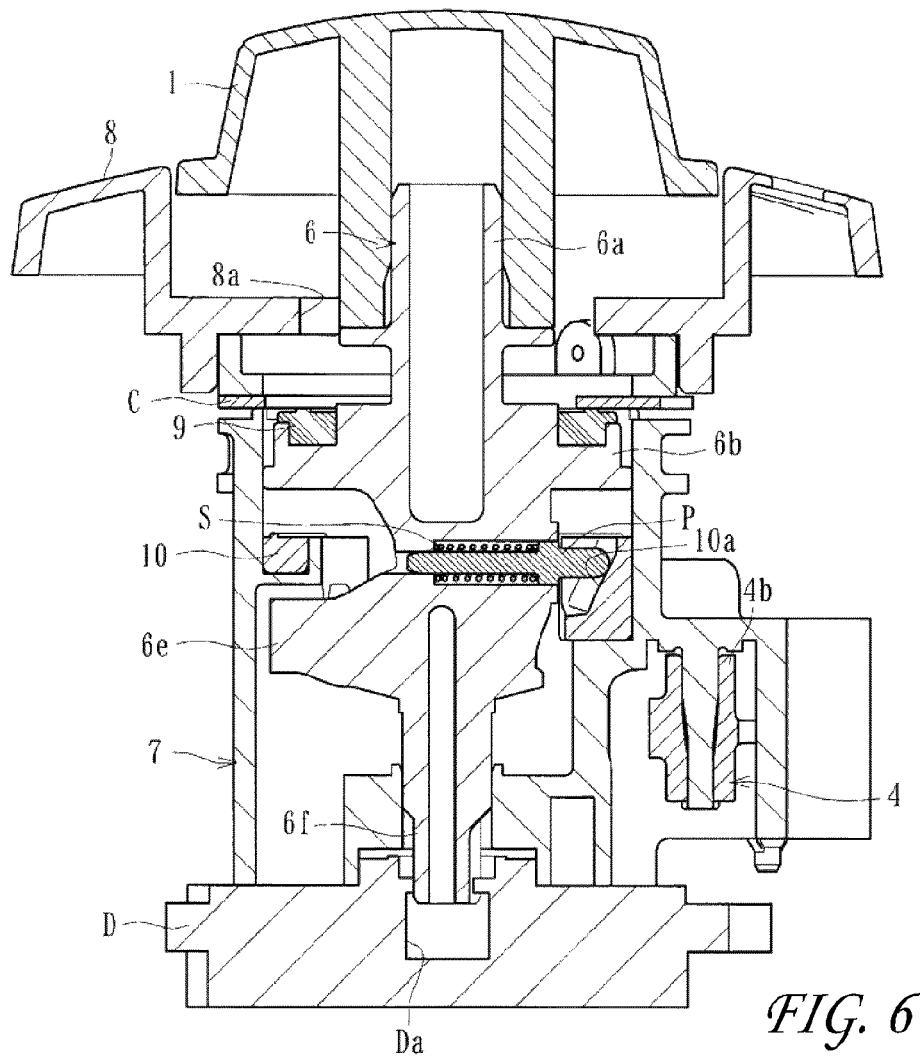
FIG. 6: A longitudinal-section view taken along a VI-VI line of FIG. 1.

As shown in FIGS. 3 and 6, a pin-like member P is laterally mounted on the shaft member 6 at its predetermined position via the coil spring S and an inner case 10 is secured on the main body 7 at a position corresponding to the mounted position of the pin-like member P. An undulation 10a is formed on the inner circumferential surface of the inner case 10 at a position (a range in which the pin-like member P is moved in accordance with rotation of the shaft member 6) corresponding to the tip of the pin-like member P. Accordingly, the pin-like member P moves along the undulation 10a with being urged by the coil spring S when the shift operating device 1 is rotated and thus a driver will feel a moderate click feeling. In this case, the undulated surface 10a is inclined as shown in FIG. 6 so that the shaft member 6 is normally urged upward by the coil spring S.

The parking position detector 2 (which can serve as parking position detecting means) comprises a detecting switch having a contact arm 2a and is adapted to detect that the shift operating device 1 is in the parking position P. That is, the contact arm 2a can be pressed against a predetermined portion of the shaft member 6 and contacts a secured electric contact to have an electrically "ON" condition to detect that the shift operating device 1 has occupied the parking position P. An ignition key can be pulled out from a key hole with being subjected to that the shift operating device 1 is in the parking position P.

The shift-lock mechanism 5 (combined with the restraint means) mainly comprises a solenoid 3 as an actuator and a stopper member 4 actuated in accordance with the operation of the solenoid 3 and functions to restrain or allow the motion of the shift operating device 1 from the parking position P (i.e. the push-down operation of the shift operation means 1). The solenoid 3 has a coil therein, to which voltage is applied by an electric signal from a controller (not shown) on a vehicle. The solenoid 3 also has an actuating shaft which may appear and disappear along with the change in magnetic field due to the voltage applied to the coil. A mounting portion 3a secured on the tip end of the actuating shaft of the solenoid is adapted to be connected to a connecting portion 4c (FIG. 2) of the stopper member 4.

Figure 5:
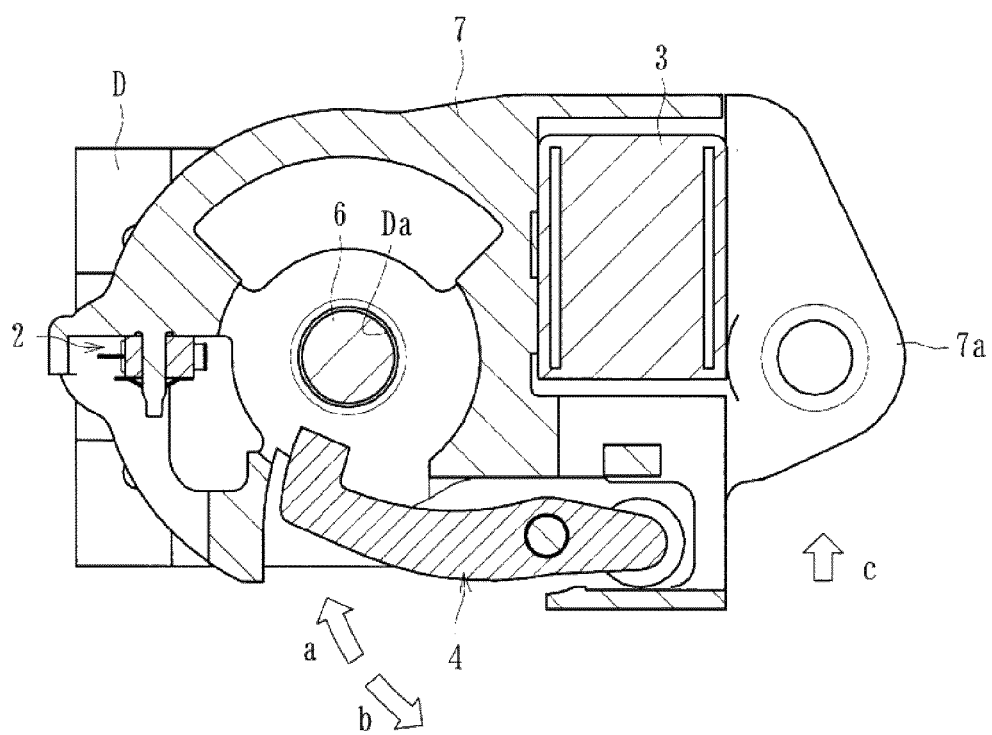
FIG. 5: A cross-section view taken along a V-V line of FIG. 1.

The stopper member 4 is formed as having a generally arm-like configuration and mounted swingably around a shaft portion 4b. As shown in FIG. 5, the stopper member 4 is normally urged toward a direction "a" by an urging means (coil spring etc.) urging the actuating shaft of the solenoid 3 toward its projected direction and swung toward a direction "b" when the solenoid 3 is energized and its actuating shaft is retracted toward a direction "c".

As shown in FIG. 3, the shaft member 6 of the shift operating device 1 is formed with a flange portion 6d at a predetermined position (position corresponding to the tip end 4a of the stopper member 4) in addition to a projected portion 6c. According to the present invention, the shift-lock mechanism 5 has a function, similarly to the prior art, of restraining or allowing the motion (pushing-down operation) of the shift operating device 1 from the parking position P, and additionally a function of restraining the motion toward the arbitrary shift position (e.g. R position) of the shift operating device 1 being in the parking preparatory condition during the course of shift from the arbitrary shift position (R position) to the parking position P.

Firstly, the function of the shift-lock mechanism 5 functioning as the restraining device is described below. When the shift operating device 1 is in the arbitrary shift position (R position), the tip end of the stopper member 4 abuts against the projected end surface of the projected portion 6c and thus both the pushing-down operation and the rotational operation of the shift operation means 1 are allowed (FIG. 9(a)). Then, when a driver rotates the shift operation means 1 to the parking preparatory condition with keeping the shift operation means 1 pushed down (FIG. 9(b)), the tip end 4a of the stopper member 4 abuts against the side surface of the projected portion 6c of the shaft member 6 by the urging means (coil spring etc.) (not shown) normally urging the actuating shaft of the solenoid 3 toward its projected direction. Thus, the motion toward the arbitrary shift position (R position) of the shift operating device 1 in the parking preparatory condition can be restrained. Under the circumstances, although the tip end 4a of the stopper member 4 restrains the motion of the shift operating device 1 toward the arbitrary shift position (R position), it allows the motion of the shift operating device 1 toward the parking position P (i.e. upward motion of the shift operating device 1).

Figure 9C:
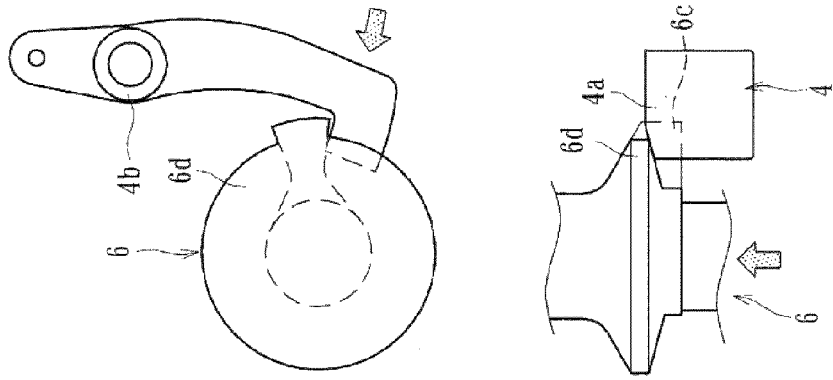
FIG. 9(*a*)-(*c*): A plan view and a side elevation view showing the course of operation of the restraint means of the shift operating apparatus for an automatic transmission of FIG. 1.
Figure 9B:
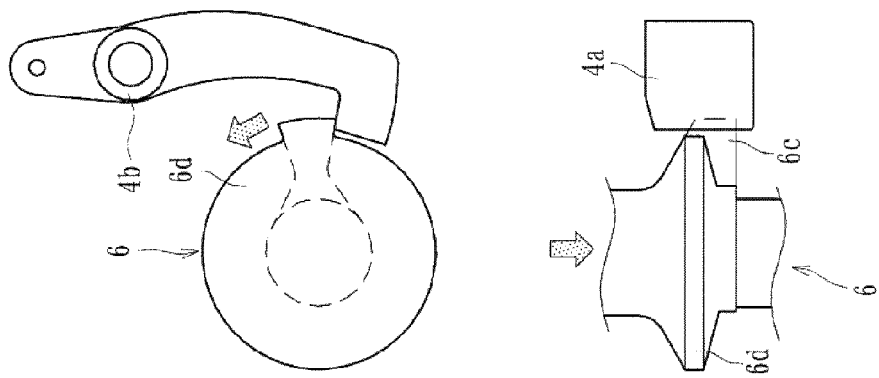
Figure 9A:
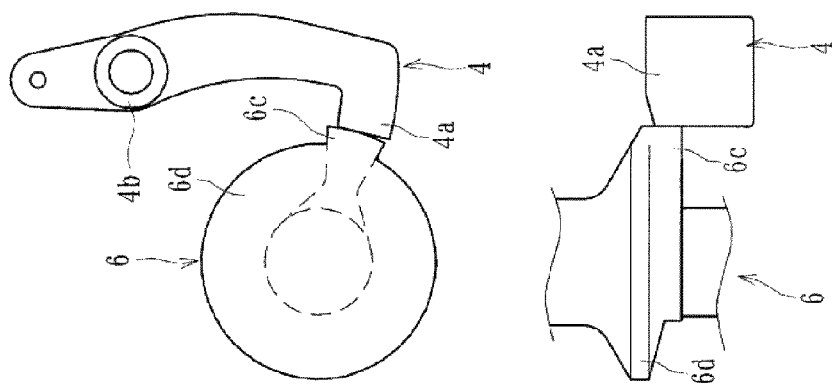
Figure 10:
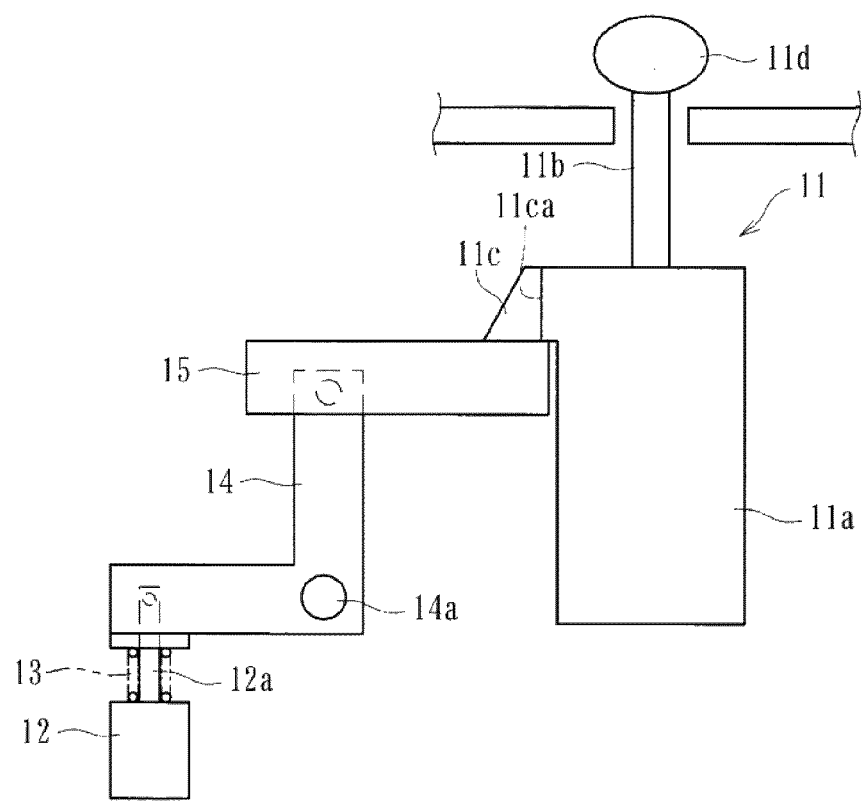
FIG. 10: A schematic view showing a shift operating apparatus for an automatic transmission according to a second embodiment of the present invention.

When the shift operating device 1 is in the parking preparatory condition, the parking position detecting means 2 is not switched "ON" and thus no detection is made. However, if the pushing-down force of the shift operating device 1 is released after the shift operating device 1 has been positioned in the parking preparatory condition, the shift operating device 1 can be moved upward to the parking position P of itself by the urging force normally applied by the coil spring S as shown in FIG. 9(c). Accordingly, the parking position detecting means 2 is switched "ON" and it is possible to confirm that the shift operating device 1 is in the parking position. Thus according to the present embodiment, it is possible to restrain the shift operation from the parking preparatory condition not being detected by the parking position detecting means 2 to the arbitrary shift position (R position).

Next, the function of the shift-lock mechanism 5 restraining or allowing the shift operating device 1 to move from the parking position P is described below. The shift operating device 1 and the shaft member 6 are moved upward to the parking position P of itself by the urging force normally applied by the coil spring S if the pushing-down force of the shift operating device 1 is released after the shift operating device 1 has been positioned in the parking preparatory condition. During which, since the stopper member 4 is normally urged by urging means (coil spring etc. of the solenoid 3 for projecting its actuating shaft to the projected direction) as previously described, the tip end 4a of the stopper member 4 is moved to a position under the flange portion 6d and thus the upper surface of the tip end 4a is contacted with the under surface of the flange portion 6d as shown in FIG. 9(c). Accordingly, the shift operating device 1 positioned in the parking position P is prevented from being moved toward the pushing-down direction and thus the pushing-down operation of the shift operating device 1 is restrained.

On the other hand, when a predetermined signal (e.g. signals indicating brake operation) from a controller unit of a vehicle is generated, the solenoid 3 is electrically energized and thus the stopper member 4 is swung to separate the tip end 4a of the stopper member 4 away from the under surface of the flange portion 6d. Accordingly, the shift operating device 1 is released from the engagement with the flange portion 6d and the pushing-down operation of the shift operating device 1 is allowed. Thus, the operation of the shift operating device 1 is allowed with being subjected to that a brake of a vehicle is operated and it is possible to improve the safety with suppressing unintended start of a vehicle due to erroneous operation of the shift operating means.

Similarly to the first embodiment, in a second embodiment, the shift operating apparatus for an automatic transmission can be secured on an instrument panel or a steering column of a vehicle such as an automobile to operate an automatic transmission of a vehicle and comprises, as shown in FIGS. 10-14, an operating knob 11d, a shift operating device 11 having a main body 11a and an operating lever 11b upwardly extending from the main body 11a, a solenoid 12 forming a shift-lock mechanism combined with a restraining means, a swing member 14 and a restraint member 15. The shift operating device 11 is that called as a gate type operating knob swingably operated fore and aft as well as left and right directions along gate grooves G.

The shift operating device 11 is able to be arbitrarily operated with being gripped and swung fore and aft as well as left and right directions along gate grooves G formed as a gate shaped (key shaped) configuration by a driver to operate the automatic transmission and to be moved between the arbitrary shift position (R position) and the parking position (P) through the parking preparatory condition (see FIG. 13) with being swung either one of left or right direction and then swung forward. That is, the parking preparatory condition in this embodiment is a condition in which the shift operating device 11 is in a position shown by "Pa" (FIG. 11(b)) and the shift operating device 11 can be operated to the parking position P by swing it toward the right therefrom.

Similarly to the first embodiment, the shift-lock mechanism combined with the restraint means has a function of restraining or allowing the motion (swing operation) of the shift operating device 11 from the parking position P, and additionally a function of restraining the motion toward the arbitrary shift position (e.g. R position) of the shift operating device 11 being in the parking preparatory condition during the course of shift from the arbitrary shift position (R position) to the parking position P.

An operating shaft 12a of a solenoid 12 is normally urged toward the projecting direction by a coil spring 13 and its tip end is connected to one end of a swing member 14. The swing member 14 is formed of "L"-shaped member and adapted to be swung around the central shaft 14a and the other end of the swing member 14 is connected to a restraint member 15. The restraint member 15 is swingable in left and right directions in FIG. 10 in accordance with swing motion of the swing member 14 and normally urged to the right direction in FIG. 10 by the urging force of the coil spring 13.

On the other hand, the main body 11a of the shift operating device 11 is formed with a projected portion 11c and the projected portion 11c is formed with a cut-out portion 11ca engageable with the restraint member 15. Accordingly, when the shift operating device 11 is in the parking preparatory condition during the course of shift from the arbitrary shift position (R position) to the parking position P, the restraint member 15 is engaged with the cut-out portion 11ca and restrain the motion of the shift operating device 11 toward the arbitrary shift position (R position).

The operation for performing the function of the shift-lock mechanism restraining the motion toward the arbitrary shift position (R position) of the shift operating device 11 in the parking preparatory condition during the course of shift from the arbitrary shift position (R position) to the parking position P will be hereinafter described.

Figure 11A:
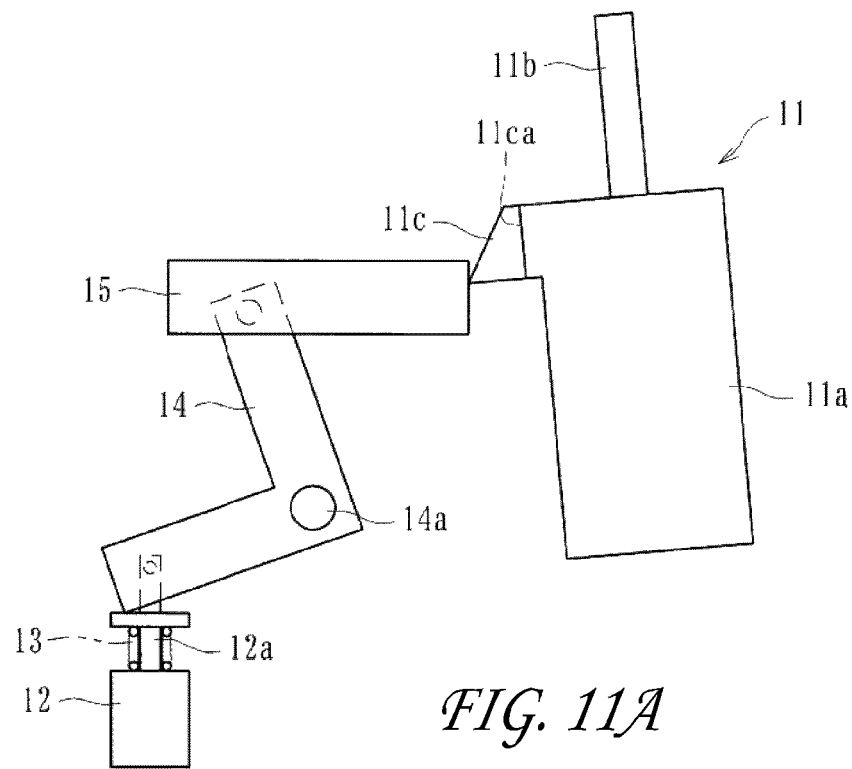
FIGS. 11(*a*) and (*b*): Schematic views showing the course of operation of the shift operating means and restraint means of the shift operating apparatus for an automatic transmission of FIG. 10.
Figure 11B:
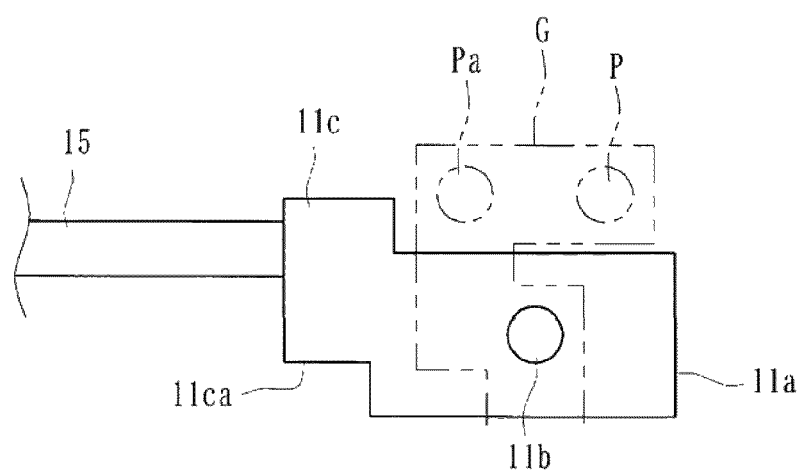
Figure 12A:
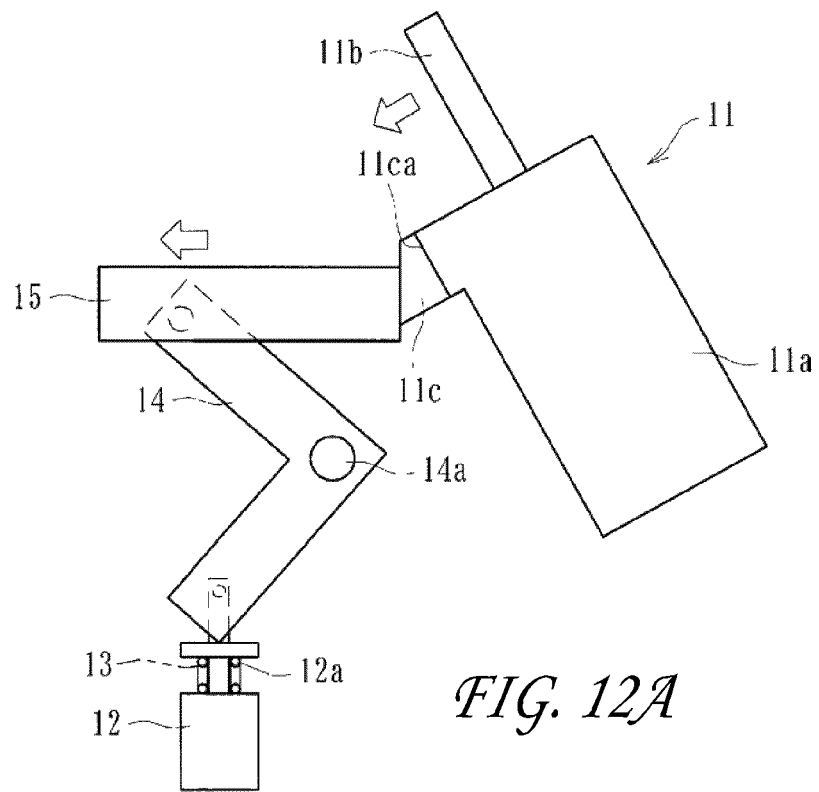
FIGS. 12(*a*) and (*b*): Schematic views showing the course of operation of the shift operating means and restraint means of the shift operating apparatus for an automatic transmission of FIG. 10.
Figure 12B:
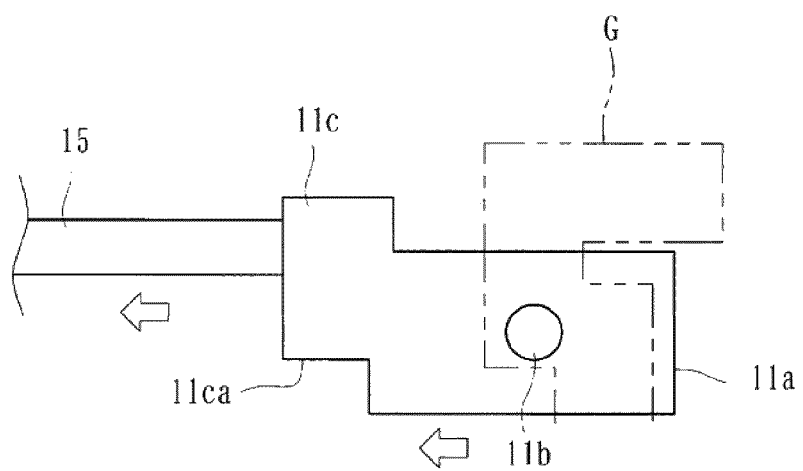
Figure 13A:
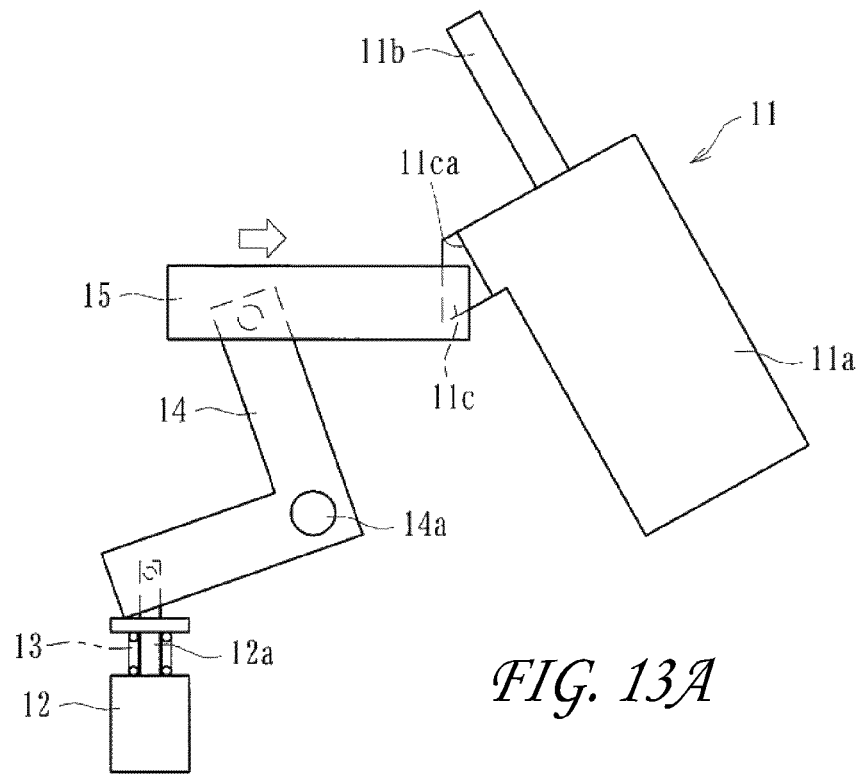
FIGS. 13(*a*) and (*b*): Schematic views showing the course of operation of the shift operating means and restraint means of the shift operating apparatus for an automatic transmission of FIG. 10.
Figure 13B:
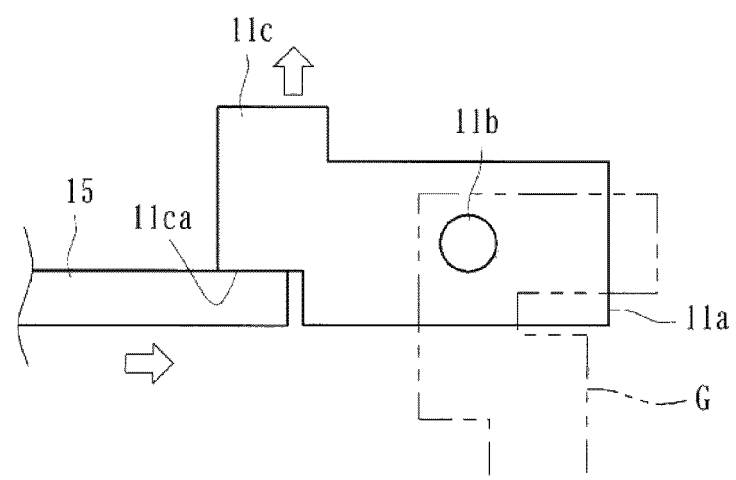

As shown in FIG. 11, the restraint member 15 is in a condition in which the tip end of the restraint member 15 abuts against the projected end of the projected portion 11c when the shift operating device 11 is in the reverse position R and thus the swing operation of the shift operation means 11 is allowed. When the shift operating device 11 positioned in the R position (see FIG. 11(b)) is swung toward the left in the drawing along the gate groove G, the restraint member 15 is pushed toward the left by the projected portion 11c against the urging force of the coil spring 13 (see FIG. 12). When the shift operating device 11 is further swung forward along the gate groove G as shown in FIG. 13, the shift operating device 11 is positioned in the position Pa (parking preparatory condition) and the restraint member 15 is engaged with the cut-out portion 11ca by the urging force of the coil spring 13.

Figure 14A:
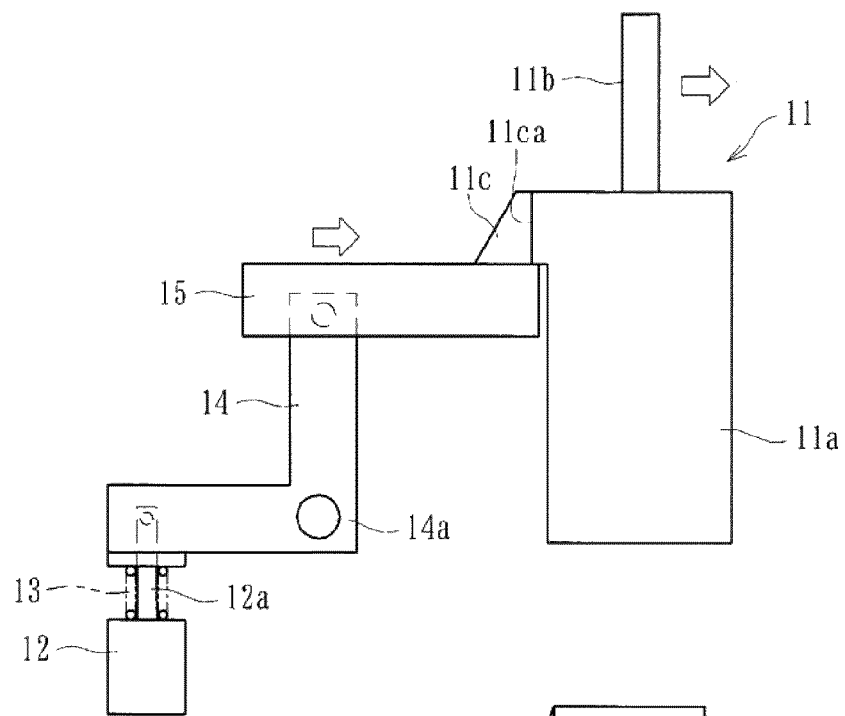
FIGS. 14(*a*) and (*b*): Schematic views showing the course of operation of the shift operating means and restraint means of the shift operating apparatus for an automatic transmission of FIG. 10.
Figure 14B:
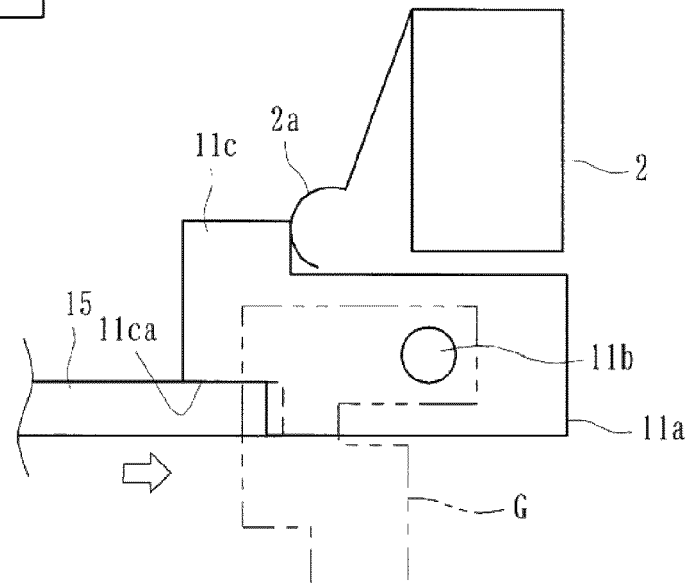

In this position (FIG. 13), the restraint member 15 engages the shift operating device 11 and one hand restrains the shift operating device 11 toward the arbitrary shift position (R position) and the other hand allows the shift operating device 11 toward the parking position (P position). Accordingly, if the shift operating device 11 is swung to the right (FIG. 13) along the gate grooves G, it is moved to the parking position P (FIG. 14). Thus the parking position detecting means 2 is switched "ON" and it is possible to confirm that the shift operating device 11 is now in the parking position P.

The function of the shift-lock mechanism of this embodiment restraining or allowing the shift operating device 11 to move from the parking position P is described below.

When the shift operating device 11 in the parking preparatory condition (FIG. 13) is swung to the right (to the parking position P) along the gate groove G, it is followed by the restraint member 15 due to the urging force of the coil spring 13.

When the shift operating device 11 is moved to the parking position P, the restraint member 15 enters below the under surface of the projected portion 11c formed on the main body 11a of the shift operating device 11 as shown in FIG. 14. Thus, further motion of the shift operating device 11 from the parking position P is restrained. On the other hand, when a predetermined signal (e.g. signals indicating brake operation) from a controller unit of a vehicle is generated, the solenoid 12 is electrically energized and thus the swing member 14 is swung to separate the restraint member 15 away from the under surface of the projected portion 11c. Accordingly, the shift operating device 11 is released from the restraint by the restraint member 15 and the operation of the shift operating device 11 is allowed with being subjected to that a brake of a vehicle is operated and it is possible to improve the safety with suppressing unintended start of a vehicle due to erroneous operation of the shift operating device 11.

Figure 15:
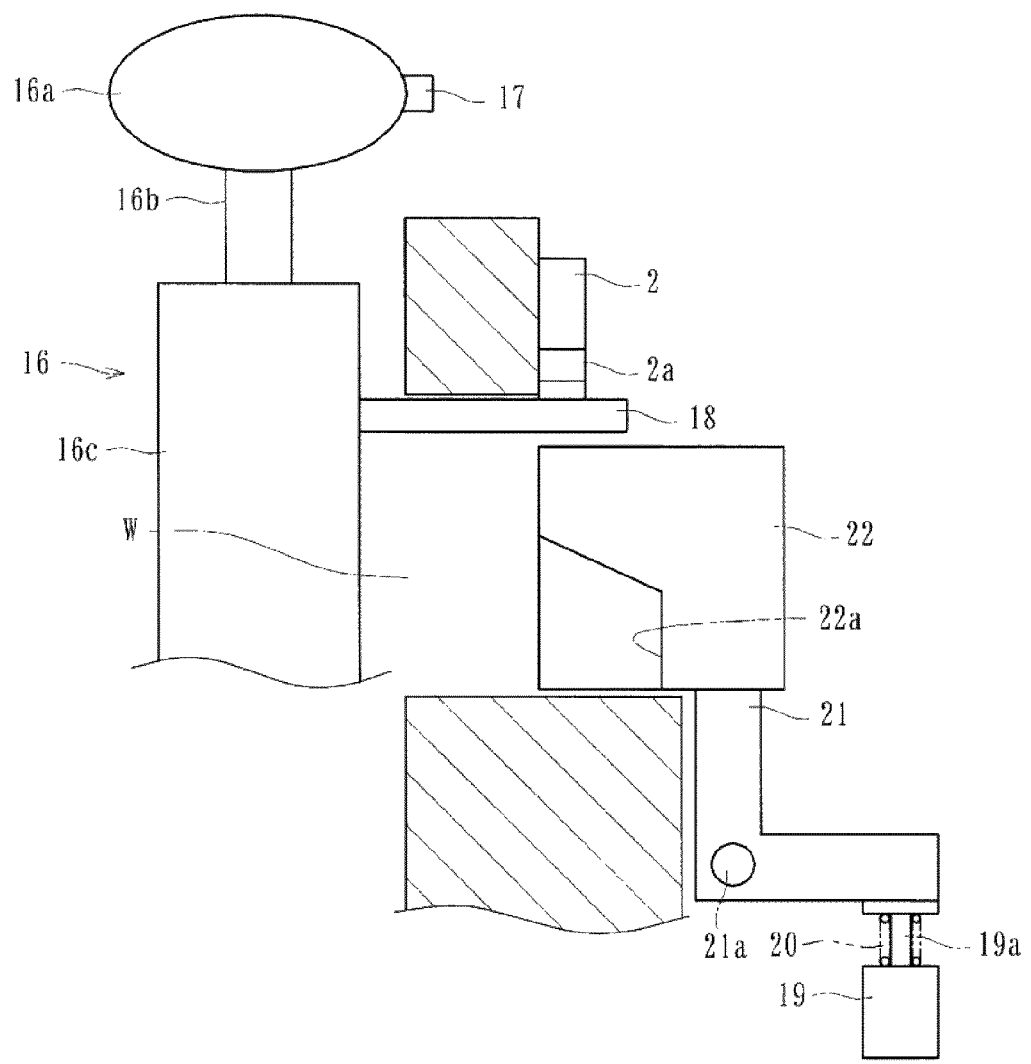
FIG. 15: A schematic view showing a shift operating apparatus for an automatic transmission according to a third embodiment of the present invention.

Similarly to the first and second embodiments, in a third embodiment, the shift operating apparatus for an automatic transmission of this embodiment can be secured on an instrument panel or a steering column of a vehicle such as an automobile to operate an automatic transmission of a vehicle and can comprise, as shown in FIGS. 15 and 16, a main body 16*c*, an operating lever 16*b* extending upward from the main body 16*c*, a operating knob 16*a* formed on the tip end of the operating lever 16*b*, a push-knob 17 formed in the operating knob 16*a*, a shift operation means 16 having a lock-pin 18, a solenoid 19, forming a shift-lock mechanism combined with the restraint means, a swing member 21 and a restraint member 22. The shift operating device 16 of this embodiment is that called as a straight type operation knob linearly swingable in fore and aft directions.

The shift operating device 16 comprises the push-knob 17 formed in the operation knob 16*a* and push-operated by a driver, and the lock-pin 18 vertically movable in accordance with the pushing operation of push-knob 17 and is able to arbitrarily operate an automatic transmission with being linearly swung in fore and aft directions. The shift operating device 16 can be moved between the arbitrary shift position (R position) and the parking position P through the parking preparatory condition (see FIG. 16(*c*)) with being swung forward by pushing the push-knob 17 of the shift operation means 16 positioned in the arbitrary shift position (R position).

That is, the lock-pin 18 is structured so that it is moved within a restraining window W formed in a main body (casing) 16*c* of the shift operating apparatus for an automatic transmission in accordance with the pushing operation of the push-knob 17 and the fore and aft swing operation of the shift operation means 16. For operating the shift operating device 16 between the arbitrary shift position (R position) and the parking position P, it is necessary to move the lock-pin 18 to a position Pa in FIG. 16(*a*) by lowering the lock-pin 18 through pushing the push-knob 17. The parking preparatory condition in this embodiment is a condition in which the lock-pin 18 is in a position denoted by Pa.

Similarly to the first and second embodiments, the shift-lock mechanism combined with the restraint means has a function of restraining or allowing the motion (swing operation) of the shift operating device 16 from the parking position P, and additionally a function of restraining the motion toward the arbitrary shift position (R position) of the shift operating device 16 being in the parking preparatory condition during the course of shift from the arbitrary shift position (R position) to the parking position P.

An operating shaft 19*a* of a solenoid 19 is normally urged toward the projecting direction by a coil spring 20 and its tip end is connected to one end of a swing member 21. The swing member 21 is formed of "L"-shaped member and adapted to be swung around the central shaft 21*a* and the other end of the swing member 21 is connected to a restraint member 22. The restraint member 22 is swingable in left and right directions in FIG. 15 in accordance with swing motion of the swing member 21 and normally urged to the left direction in FIG. 15 by the urging force of the coil spring 20.

A cut-out portion 22*a* is formed on one side surface (a surface opposing to the lock-pin 18) of the restraint member 22 and the cut-out portion 22*a* is formed with a wall surface 22*a* and an inclined surface 22*ab*. The shift-lock function is structured so that it restrains the motion toward the arbitrary shift position (R position) of the shift operating device 16 being in the parking preparatory condition during the course of shift from the arbitrary shift position (R position) to the parking position P with the lock-pin 18 being abutted against the wall surface 22*aa* of the cut-out portion 22*a* of the restraint member 22.

The operation for performing the function of the shift-lock mechanism restraining the motion toward the arbitrary shift position (R position) of the shift operating device 16 in the parking preparatory condition during the course of shift from the arbitrary shift position (R position) to the parking position P will be hereinafter described.

As shown in FIG. 16(*a*), the end surface of the lock-pin 18 is in a condition in which it is abutted against the side surface of the restraint member 22 when the shift operating device 16 is in the reverse position R and thus motion of the lock-pin 18 is allowed. The lock-pin 18 is lowered (see FIG. 16(*b*)) and released from the restraint by the restraint window W by pushing the push-knob 17 of the shift operating device 16 in the R position (see FIG. 16(*a*)). Under this condition, when the shift operating device 16 is swung forward, the lock-pin 18 is moved to the position Pa and the shift operating device 16 is positioned in the parking preparatory condition (see FIG. 16(*c*)).

Under the parking preparatory condition, since the restraint member 22 is moved in a direction from a back part to a front part on the sheet of FIG. 16 by the urging force of the coil spring 20, the lock-pin 18 is entered into the cut-out portion 22*a* and accordingly engaged with the wall surface 22*aa*. The lock-pin 18 entered into the cut-out portion 22*a* is allowed to move upward in FIG. 16 by action of the inclined surface 22*ab*. Thus, the restraint member 22 is engaged with the shift operating device 16 in a direction toward the arbitrary shift position (R position) and restrains its motion toward the arbitrary shift position (R position) and allows the motion of the lock-pin 18 toward the parking position P. Accordingly, if the lock-pin 18 is moved upward by releasing the pushing force to the push-knob 17, the lock-pin 18 is then moved to the parking position as shown in FIG. 16(*d*). Thus it is possible to confirm that the shift operating device 16 is the parking position P owing to switch "ON" of the parking position detecting means 2.

The function of the shift-lock mechanism of this embodiment restraining or allowing the shift operating device 16 to move from the parking position P is described below.

When the lock-pin 18 of the shift operating device 16 in the parking preparatory condition is moved upward, the restraint member 22 is also moved upward by the urging force of the coil spring 20. When the lock-pin 18 is moved to the parking position P, the lock-pin 18 is positioned higher than the upper end surface of the restraint member 22 and thus the motion from the parking position P is restrained. On the other hand, when a predetermined signal (e.g. signals indicating a brake operation) from a controller unit of a vehicle is generated, the solenoid 19 is electrically energized and thus the swing member 21 is swung to separate the restraint member 22 away from the lock-pin 18. Accordingly, the shift operating device 16 is released from the restraint by the restraint member 22 and thus the operation of the lock-pin 18 by the push-knob as well as the operation by the shift operating device 16 is allowed with being subjected to that a brake of a vehicle is operated and it is possible to improve the safety with suppressing unintended start of a vehicle due to erroneous operation of the shift operating device 16.

According to first through third embodiments of the present invention, since the shift operating apparatus for an automatic transmission is provided with the restraint means for restraining motion toward the arbitrary shift position of the shift operating means (1, 11, 16) being in the parking preparatory condition during the course of shift from the arbitrary shift position to the parking position, it is possible to prevent a shift operating means being in a parking preparatory condition from being moved to an arbitrary shift position during the course of shift from the arbitrary shift position to the parking position and thus to further improve the safety of a vehicle.

Also according to first through third embodiments of the present invention, since the restraint means comprises a shift-lock mechanism for restraining or allowing the motion from the parking position of the shift operating means, it is possible to combine the shift-lock mechanism with the function of the restraint means and thus to reduce the number of structural parts as compared with a mechanism having a shift-lock mechanism separate from a restraint means. In addition, since the shift operating apparatus utilizes the urging force of solenoid urging means forming the shift-lock mechanism during the course of restraint by the restraint means, it is possible to actuate the restraint means in functioning times both of the restraint means and the shift-lock mechanism.

According to the first embodiment of the present invention, it can be applied to a shift operating apparatus for an automatic transmission comprising a shaft member and an operating knob of a dial-type shift operating apparatus. Also in such a shift operating apparatus for an automatic transmission, it is possible to prevent a shift operating means being in a parking preparatory condition from being moved to an arbitrary shift position during the course of shift from the arbitrary shift position to the parking position and thus to further improve the safety of a vehicle.

Also according to the first embodiment of the present invention, since the shaft member 6 of the shift operating device 1 comprises a projected portion 6c formed on the shaft member 6 at a predetermined position thereof; the restraint means 5 comprises a stopper member 4 ordinarily urged toward a direction engageable with the projected portion 6c, and the stopper member 4 of the restraint means 5 engages the projected portion 6c of the shift operating device 1 being in the parking preparatory condition and restrains the motion of the shift operating device 1 toward the arbitrary shift position and allows the motion of the shift operating device 1 toward the parking position, it is possible in a simple structure to prevent a shift operating means being in a parking preparatory condition from being moved to an arbitrary shift position during the course of shift from the arbitrary shift position to the parking position and thus to improve the safety of a vehicle.

Further according to the first embodiment of the present invention, since the shaft member 6 of the shift operating device 1 comprises a flange portion 6d in addition to the projected portion 6c, the restraint means 5 comprises a shift-lock mechanism 5 in which the stopper member 4 contacts the under surface of the flange portion 6d when the shift operating device 1 is in the parking position and restrains the motion toward a push-down direction of the shift operating device 1 and in which the stopper member 4 is separated from the flange portion 6d to allow the push-down operation of the shift operating device 1, it can be applied to a shift operating apparatus for an automatic transmission comprising a shaft member and an operating knob of a dial-type shift operating apparatus. Also in such a shift operating apparatus for an automatic transmission, it is possible to combine the shift-lock mechanism with the function of the restraint means and thus to reduce the number of structural parts as compared with a mechanism having a shift-lock mechanism separate from a restraint means.

According to the second embodiment of the present invention, it can be applied to a shift operating apparatus for an automatic transmission comprising an operating lever and an operating knob of a gate-type shift operating apparatus. Also in such a shift operating apparatus for an automatic transmission, it is possible to prevent a shift operating device 11 being in a parking preparatory condition from being moved to an arbitrary shift position during the course of shift from the arbitrary shift position to the parking position and thus to further improve the safety of a vehicle.

According to the third embodiment of the present invention, it can be applied to a shift operating apparatus for an automatic transmission in which the shift operating device 16 comprises a push knob 17 pushably operated by a driver and a lock pin 18 moveable between a restraint position restraining the operation of the shift operating device 16 and an allowable position allowing the operation of the shift operating device 16, the shift operating device 16 further comprising an operating lever 16b and an operating knob 16a of a shift operating apparatus which is able to be moved between the arbitrary shift position and the parking position through the parking preparatory condition by a driver with the push knob 17 being pushed down to move the lock pin 18 to the allowable position. Also in such a shift operating apparatus for an automatic transmission, it is possible to prevent a shift operating device 16 being in a parking preparatory condition from being moved to an arbitrary shift position during the course of shift from the arbitrary shift position to the parking position and thus to further improve the safety of a vehicle.

Although the present inventions have been described with reference to the preferred embodiments, modifications and alternations will occur to those of ordinary skill in the art upon reading and understanding the preceding detailed description. For example, separately from a shift-lock mechanism for restraining or allowing motion from the parking position of the shift operating means, it may be possible to arrange a restraint means for restraining motion toward arbitrary shift position of a shift operating means in the parking preparatory condition during the course of shift from the arbitrary shift position to the parking position.

In addition, although it has been described as embodiments a dial-type shift operating apparatus of which shift operating means comprising a shaft member and an operation knob (first embodiment), a gate-type shift operating apparatus comprising an operating lever and an operating knob swingable fore and aft as well as left and right along gate grooves (second embodiment), and a straight-type shift operating apparatus comprising an operating lever and an operating knob linearly swingable fore and aft (third embodiment), the present invention can be applied to other kinds of shift operating apparatus having other forms of shift operating means.

The present inventions can be applied to any type of shift operating apparatus for an automatic transmission having different external views or additional functions so long as they have a restraint means for restraining a motion toward an arbitrary shift position of a shift operating means in a parking preparatory condition during the course of shift from the arbitrary shift position to the parking position.

What is claimed is:

1. A shift operating apparatus for an automatic transmission of a vehicle comprising:
   a shift operating means for operating an automatic transmission of a vehicle and to move between a parking position and an arbitrary shift position other than the parking position;
   a parking position detecting means for detecting when the shift operating means is in the parking position;
   the shift operating means being adapted to be moved through a parking preparatory condition during the course of shift between the parking position and the arbitrary shift position; and
     a restraint means for restraining motion toward the arbitrary shift position of the shift operating means, wherein the shift operating means is in the parking preparatory condition after moving in a direction from the arbitrary shift position toward the parking position during the course of shift from the arbitrary shift position to the parking position.

2. A shift operating apparatus for an automatic transmission of claim 1 wherein the restraint means comprises a shift-lock mechanism for restraining and allowing the motion from the parking position of the shift operating means.

3. A shift operating apparatus for an automatic transmission of claim 1, wherein the shift operating means comprises a shaft member and an operating knob of a dial-type shift operating apparatus which is able to be operated by being gripped and rotated by a driver to operate the automatic transmission and to be moved between the arbitrary shift position and the parking position through the parking preparatory condition by axially being pushed down, and wherein the restraint means engages the shift operating means being in the parking preparatory condition and restrains the motion of the shift operating means toward the arbitrary shift position and allows the motion of the shift operating means toward the parking position.

4. A shift operating apparatus for an automatic transmission of claim 2, wherein the shift operating means comprises a shaft member and an operating knob of a dial-type shift operating apparatus which is able to be operated by being gripped and rotated by a driver to operate the automatic transmission and to be moved between the arbitrary shift position and the parking position through the parking preparatory condition by axially being pushed down, and wherein the restraint means engages the shift operating means being in the parking preparatory condition and restrains the motion of the shift operating means toward the arbitrary shift position and allows the motion of the shift operating means toward the parking position.

5. A shift operating apparatus for an automatic transmission of claim 3 wherein the shaft member of the shift operating means comprises a projected portion formed on the shaft member at a predetermined position thereof; the restraint means comprises a stopper member ordinarily urged toward a direction engageable with the projected portion, and wherein the stopper member of the restraint means engages the projected portion of the shift operating means being in the parking preparatory condition and restrains the motion of the shift operating means toward the arbitrary shift position and allows the motion of the shift operating means toward the parking position.

6. A shift operating apparatus for an automatic transmission of claim 5 wherein the shaft member of the shift operating means comprises a flange portion in addition to the projected portion, wherein the restraint means comprises a shift-lock mechanism in which the stopper member contacts the under surface of the flange portion when the shift operating means is in the parking position and restrains the motion toward a push-down direction of the shift operating means and in which the stopper member is separated from the flange portion to allow the push-down operation of the shift operating means.

7. A shift operating apparatus for an automatic transmission of claim 1 wherein the shift operating means comprises an operating lever and an operating knob of a gate-type shift operating apparatus which is able to be operated with being gripped and swung fore and aft as well as left and right directions by a driver to operate the automatic transmission and to be moved between the arbitrary shift position and the parking position through the parking preparatory condition by being swung either one of left or right direction and then swung forward, and wherein the restraint means engages the shift operating means being in the parking preparatory condition and restrains the motion of the shift operating means toward the arbitrary shift position and allows the motion of the shift operating means toward the parking position.

8. A shift operating apparatus for an automatic transmission of claim 2 wherein the shift operating means comprises an operating lever and an operating knob of a gate-type shift operating apparatus which is able to be operated with being gripped and swung fore and aft as well as left and right directions by a driver to operate the automatic transmission and to be moved between the arbitrary shift position and the parking position through the parking preparatory condition by being swung either one of left or right direction and then swung forward, and wherein the restraint means engages the shift operating means being in the parking preparatory condition and restrains the motion of the shift operating means toward the arbitrary shift position and allows the motion of the shift operating means toward the parking position.

9. A shift operating apparatus for an automatic transmission of claim 1 wherein the shift operating means comprises a push knob pushably operated by a driver and a lock pin moveable between a restraint position restraining the operation of the shift operating means and an allowable position allowing the operation of the shift operating means, the shift operating means further comprising an operating lever and an operating knob of a shift operating apparatus which is able to be moved between the arbitrary shift position and the parking position through the parking preparatory condition by a driver with the push knob being pushed down to move the lock pin to the allowable position, and wherein the restraint means abuts the lock pin so as to restrain the motion of the shift operating means being in the parking preparatory condition toward the arbitrary shift position and allow its motion toward the parking position.

10. A shift operating apparatus for an automatic transmission of claim 2 wherein the shift operating means comprises a push knob pushably operated by a driver and a lock pin moveable between a restraint position restraining the operation of the shift operating means and an allowable position allowing the operation of the shift operating means, the shift operating means further comprising an operating lever and an operating knob of a shift operating apparatus which is able to be moved between the arbitrary shift position and the parking position through the parking preparatory condition by a driver with the push knob being pushed down to move the lock pin to the allowable position, and wherein the restraint means abuts the lock pin so as to restrain the motion of the shift operating means being in the parking preparatory condition toward the arbitrary shift position and allow its motion toward the parking position.

11. A shift operating apparatus for an automatic transmission of a vehicle comprising:
- a shift operating device configured to switch an automatic transmission of a vehicle and between a park position and a plurality of other gear positions other than the park position;
- a park position detector configured to detect when the shift operating device is in the park position, wherein the shift operating device is configured to be moved through a parking preparatory position during a course of shift between the park position and the plurality of other gear positions;
- a restraint device configured to restrain motion of the shift operating device toward the plurality of other gear positions when the shift operating device is in the parking preparatory position during a movement from one of the plurality of other gear positions to the park position.

12. A shift operating apparatus for an automatic transmission of claim 11 wherein the restraint device comprises a shift-lock mechanism configured to restrain and allowing the movement from the park position of the shift operating device.

13. A shift operating apparatus for an automatic transmission of claim 11 wherein the shift operating device comprises a shaft member and an operating knob of a dial-type shift operating apparatus which is configured to be operated by being gripped and rotated by a driver to operate the automatic transmission and to be moved between one of the other gear positions and the park position through the parking preparatory condition by axially being pushed down, and wherein the restraint device engages the shift operating device when in the parking preparatory condition and restrains the motion of the shift operating device toward the plurality of other gear positions and allows the movement of the shift operating device toward the park position.

14. A shift operating apparatus for an automatic transmission of claim 12 wherein the shift operating device comprises a shaft member and an operating knob of a dial-type shift operating apparatus which is configured to be operated by being gripped and rotated by a driver to operate the automatic transmission and to be moved between one of the other gear positions and the park position through the parking preparatory condition by axially being pushed down, and wherein the restraint device engages the shift operating device when in the parking preparatory condition and restrains the motion of the shift operating device toward the plurality of other gear positions and allows the movement of the shift operating device toward the park position.

15. A shift operating apparatus for an automatic transmission of claim 13 wherein the shaft member of the shift operating device comprises a projected portion formed on the shaft member at a predetermined position thereof; the restraint device comprises a stopper member biased toward a direction engageable with the projected portion, and wherein the stopper member of the restraint device engages the projected portion of the shift operating device when in the parking preparatory condition and restrains the motion of the shift operating device toward the plurality of other gear positions and allows the motion of the shift operating device toward the parking position.

16. A shift operating apparatus for an automatic transmission of claim 15 wherein the shaft member of the shift operating device comprises a flange portion in addition to the projected portion, wherein the restraint device comprises a shift-lock mechanism in which the stopper member contacts the under surface of the flange portion when the shift operating device is in the parking position and restrains the motion toward a push-down direction of the shift operating device and in which the stopper member is separated from the flange portion to allow the push-down operation of the shift operating device.

17. A shift operating apparatus for an automatic transmission of claim 11 wherein the shift operating device comprises an operating lever and an operating knob of a gate-type shift operating apparatus which is able to be operated by being gripped and swung fore and aft as well as left and right directions by a driver to operate the automatic transmission and to be moved between the plurality of gear positions and the parking position through the parking preparatory condition by being swung either one of left or right direction and then swung forward, and wherein the restraint device engages the shift operating device being in the parking preparatory condition and restrains the motion of the shift operating device toward the plurality of gear positions and allows the motion of the shift operating device toward the parking position.

18. A shift operating apparatus for an automatic transmission of claim 12 wherein the shift operating device comprises an operating lever and an operating knob of a gate-type shift operating apparatus which is able to be operated by being gripped and swung fore and aft as well as left and right directions by a driver to operate the automatic transmission and to be moved between the plurality of gear positions and the parking position through the parking preparatory condition by being swung either one of left or right direction and then swung forward, and wherein the restraint device engages the shift operating device being in the parking preparatory condition and restrains the motion of the shift operating device toward the plurality of gear positions and allows the motion of the shift operating device toward the parking position.

19. A shift operating apparatus for an automatic transmission of claim 11 wherein the shift operating device comprises a push knob pushably operated by a driver and a lock pin moveable between a restraint position restraining the operation of the shift operating device and an allowable position allowing the operation of the shift operating device, the shift operating device further comprising an operating lever and an operating knob of a shift operating apparatus which is able to be moved between the plurality of other gear positions position and the park position through the parking preparatory condition by a driver with the push knob being pushed down to move the lock pin to the allowable position, and wherein the restraint device abuts the lock pin so as to restrain the motion of the shift operating device from the parking preparatory condition toward the plurality of other gear positions and allows motion toward the parking position.

* * * * *